Feb. 4, 1930.                M. S. WATSON                1,745,652
              PROTECTIVE DEVICE FOR VEHICLE WINDOWS
                    Filed Dec. 10, 1927      2 Sheets-Sheet 1
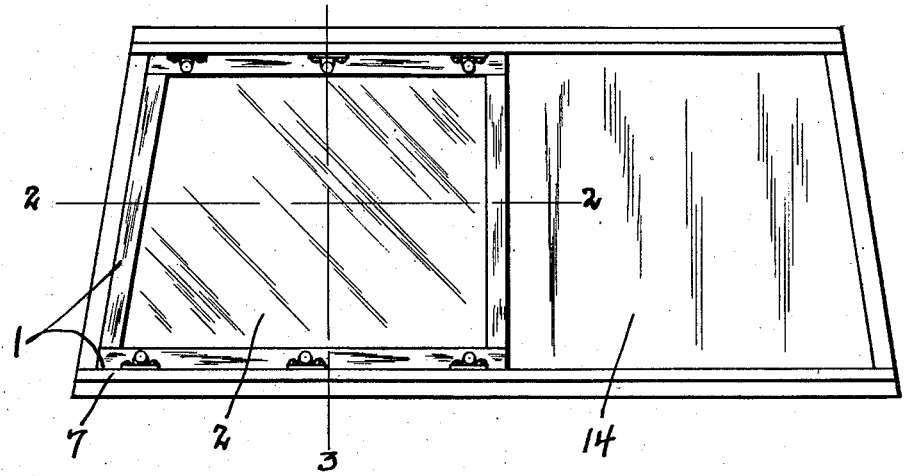
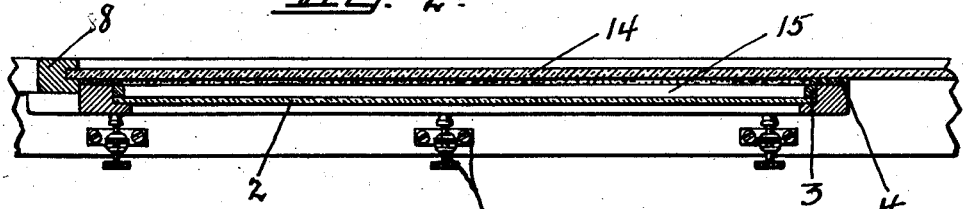
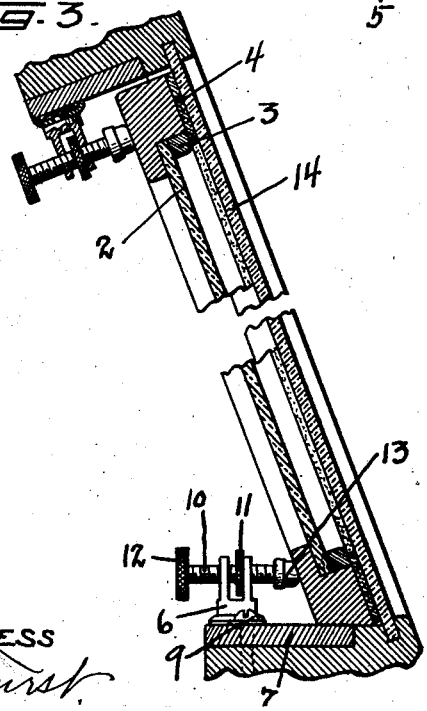
Matthew S. Watson
INVENTOR
Denison & Thompson
BY
ATTORNEYS.

Feb. 4, 1930.  M. S. WATSON  1,745,652
PROTECTIVE DEVICE FOR VEHICLE WINDOWS
Filed Dec. 10, 1927  2 Sheets-Sheet 2
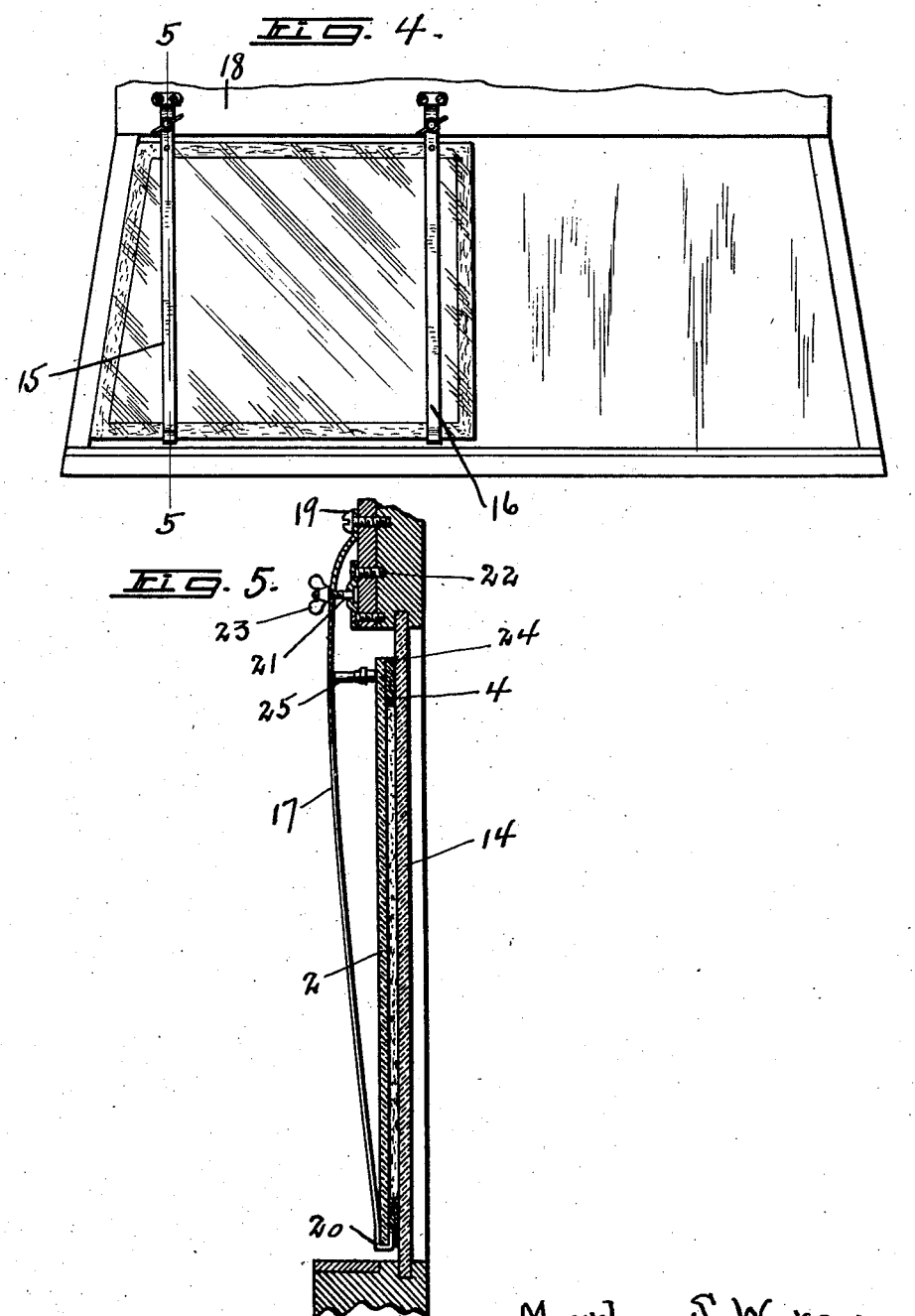
Matthew S. Watson,
INVENTOR
Denison T Thompson
BY
ATTORNEYS.
WITNESS
H. V. Hurst Patented Feb. 4, 1930

1,745,652

UNITED STATES PATENT OFFICE

MATTHEW S. WATSON, OF WATERTOWN, NEW YORK, ASSIGNOR OF ONE-HALF TO COLONIAL MOTOR COACH CORPORATION, OF WATERTOWN, NEW YORK, A CORPORATION OF NEW YORK

PROTECTIVE DEVICE FOR VEHICLE WINDOWS

Application filed December 10, 1927. Serial No. 239,153.

This invention relates to a new and improved protective device for vehicle windows and is particularly designed for use on the glass front of an inclosed automobile.

When inclosed automobiles are driven in cold weather the interior of the vehicle becomes considerably warmer than the outside temperature with the result that moisture will be deposited on the inside of the windows of the vehicle and will freeze thereon which will tend to make the glass translucent instead of transparent with the result that the vision of the driver is impaired.

The main object of my invention is to provide a device which will keep the windows of an inclosed vehicle from frosting no matter what the outside temperature may be compared with the temperature inside of the vehicle.

Another object of my invention is to provide a protective means for the glass windows of a vehicle which can be applied and removed with the minimum of effort. This is desirable because such a protective device is not necessary or desirable in warm weather.

Other objects and advantages relate to the size, shape and arrangement of parts, as will more fully appear from the following description, taken in connection with the accompanying drawings in which:—

Figure 1 is a perspective view of my device applied to the windshield of an automobile.

Figure 2 is a section on line 2—2 of Figure 1.

Figure 3 is a section on line 3—3 of Figure 1.

Figure 4 is an elevation of a modified form of my device.

Figure 5 is a section on line 5—5 of Figure 4.

My device consists of a frame —1— in which is inserted a transparent glass —2—, which glass is held in place by a retaining strip —3—. The frame —1— is of a size and shape to fit the windshield of the automobile and although I have shown in Figure 1 such a device as being applied only to the half of the windshield which is in front of the driver it will be understood that the frame can be made of the proper size and shape to cover the full windshield, if desired. Similarly, although I have shown the application of my device to the windshield of an automobile, other devices of the same kind and character can be applied to the other windows of the vehicle.

The device is preferably installed on the inside of the glass front and is placed against the outer rim of the front with a filling means —4— such as felt around the device and between it and the glass of the glass front.

The means for holding the device in position are preferably adjustable so that they may be from time to time taken up to insure that the device is always in tight contact with the windshield frame. I have here shown six retaining devices —5— although it will be understood that the number and position of such retaining devices will be determined by the size and shape of the frame —1—.

The retaining devices are similar and, therefore, a description of one will be a description of all. The retaining device —5— consists of a U-shaped body —6— which is fastened to the body of the automobile —7— adjacent to the frame —8— of the glass front by screws —9— or other convenient means. The body —6— is pierced by threaded holes so that the take-up screw —10— when threaded through the body —6— will lie in a position parallel to that part of the automobile body —7— to which the device —5— is attached. The take-up screw —10— carries on its stem, between the two ears of the body —6—, a locking nut —11— and also carries on its rear extremity a knurled knob —12—. The forward end of the screw —10— carries a cushion —13—, preferably of rubber, so that the screw —10— will not be directly affected by the vibration of my device. It will be seen that when the screws —10— are threaded forwardly through the body —6— with the knob —13— against the frame —1— of my device that the device will be forced forwardly against the cushioning strip —4— which, in turn, will be forced against the glass —14— of the glass front of the vehicle. When the device is thus in position a dead air space —15— will be formed between the glass —2— of my device and the glass —14— of the glass front.

It is well-known that a dead air space is a very efficient insulating means and the result in this case is that the glass of my device will not become sufficiently cold to cause moisture from the air inside the vehicle to be deposited on it. For the same reason the air in the dead air space —15— will not become sufficiently warm so that moisture will be deposited on the inside of the glass —14— of the glass front. The result of this is that no matter what the outside temperature as compared with the temperature inside of the vehicle body may be the glass —14— of the glass front and the glass —2— of my device will at all times remain free from deposited moisture and will remain transparent so that the vision of the operator of the vehicle will not be impaired.

It will be understood that when the screws —10— are all retracted that my device may be easily removed from its position when it is not desired to have it in place.

In Figures 4 and 5 I show a modified form of my device in which I attach it to the wind-shield of an automobile by means of spring clips 15 and 16 which are similar in design and a description of one is a description of the other.

Spring clip —15— consists of a narrow curved flat spring —17— which is secured to the top —18— of the wind-shield frame by means of screws —19—. The lower end —20— of spring —17— is returned bent to form a clip for the reception of the glass —2— of my device. In this modified form the frame —1— previously described is omitted and the glass —2— without a frame —1— is positioned against the wind-shield. A take up screw —21— is secured to the top —18— of the wind-shield frame by means of screws —22— and is positioned below screws —19—. Take up screw —21— extends through a hole in spring —17— and carries on its outer end a wing nut —23—. When spring —17— is in position on frame —18— and is not under tension its shape is such that its lower end —20— will be adjacent to the glass —14— of the wind-shield. It will be understood that when wing nut —23— is screwed down against spring —17— it will cause spring —17— to exert a spring pressure at its lower end against glass —14— and this pressure may be increased or decreased as desired by screwing wing nut —23— towards or from spring —17—.

In a position to register with the upper end —24— of glass —2— spring —17— carries an inwardly extending finger —25— of a size and shape to exert on the top part of —24— a pressure approximately equal to the pressure exerted on the lower end of glass —2— by the lower end —20— of spring —17—.

In this modified form of installation there is also used a filling means —4— between the glass —2— and the glass —14— around the edge of glass —2—.

And although I have shown and described a particular form, size and arrangement of parts as illustrative of an embodiment of my invention I do not desire to restrict myself to the exact shape, form or relation of parts, as various changes may be made within the scope of the appended claims.

What I claim is:—

1. A protective device for vehicle windows comprising a glass smaller in size than the window to be protected, a filling means on the edges of one side of the glass, a pair of springs having their upper ends positioned above the window and having their lower ends return bent for the reception of the lower edge of the glass, a finger mounted on each of the springs for registration with the upper edge of the glass, and means for increasing the tension on the spring whereby the glass is held against the window with the filler therebetween.

2. A protective device for vehicle windows comprising a glass smaller in size than the window to be protected, a filling means on the edges of one side of the glass, a pair of springs having their upper ends positioned above the window and having their lower ends return bent for the reception of the lower edge of the glass, a finger mounted on each of the springs for registration with the upper edge of the glass, bolts positioned above the window and extending through holes in the springs, and nuts on the bolts for moving the springs toward the window.

3. In a device of the class described, a glass, a cushioning device on the outside edges of the glass on one side thereof and spring means for holding the cushioning device and the glass against the inside of a vehicle window to make an air-tight joint, said spring means constituting the sole support for the glass.

In witness whereof I have hereunto set my hand this 26th day of November, 1927.

MATTHEW S. WATSON.